United States Patent
Therien et al.

(10) Patent No.: US 8,386,808 B2
(45) Date of Patent: Feb. 26, 2013

(54) ADAPTIVE POWER BUDGET ALLOCATION BETWEEN MULTIPLE COMPONENTS IN A COMPUTING SYSTEM

(75) Inventors: Guy Therien, Beaverton, OR (US); Murali Ramadoss, Folsom, CA (US); Gregory D. Kaine, Santa Clara, CA (US); Eric C. Samson, Folsom, CA (US); Venkatesh Ramani, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 12/341,600

(22) Filed: Dec. 22, 2008

(65) Prior Publication Data

US 2010/0162006 A1 Jun. 24, 2010

(51) Int. Cl.
*G06F 1/00* (2006.01)
(52) U.S. Cl. ........................................................ 713/300
(58) Field of Classification Search .................... 713/300
See application file for complete search history.

(56) References Cited

U.S. PATENT DOCUMENTS

| | | | | |
|---|---|---|---|---|
| 7,389,435 | B2 * | 6/2008 | Barr et al. | 713/322 |
| 7,650,519 | B1 * | 1/2010 | Hobbs et al. | 713/300 |
| 7,757,107 | B2 * | 7/2010 | Goodrum et al. | 713/320 |
| 8,151,122 | B1 * | 4/2012 | Ranganathan et al. | 713/300 |
| 2007/0035543 | A1 * | 2/2007 | David et al. | 345/420 |
| 2007/0067136 | A1 * | 3/2007 | Conroy et al. | 702/130 |
| 2007/0083774 | A1 * | 4/2007 | Baurer et al. | 713/300 |
| 2007/0300085 | A1 * | 12/2007 | Goodrum et al. | 713/300 |
| 2008/0028778 | A1 * | 2/2008 | Millet | 62/129 |
| 2008/0077817 | A1 * | 3/2008 | Brundridge et al. | 713/340 |
| 2008/0082851 | A1 * | 4/2008 | Zettler | 713/340 |
| 2008/0109611 | A1 * | 5/2008 | Liu et al. | 711/149 |
| 2009/0031152 | A1 * | 1/2009 | Bolderl-Ermel et al. | 713/300 |
| 2009/0113221 | A1 * | 4/2009 | Holle et al. | 713/310 |

* cited by examiner

*Primary Examiner* — Mohammed Rehman
(74) *Attorney, Agent, or Firm* — Buckley, Maschoff & Talwalker LLC

(57) ABSTRACT

According to some embodiments, a power budget allocation engine of a multi-component computer system may receive a power budget allocation adjustment request signal from a first component. Based on the received budget allocation adjustment request signal (and, in some embodiments, a component preference), the power budget allocation engine may determine whether to adjust a power budget allocation signal provided to the first component.

18 Claims, 5 Drawing Sheets

ADAPTIVE POWER BUDGET ALLOCATION BETWEEN MULTIPLE COMPONENTS IN A COMPUTING SYSTEM

BACKGROUND

Components in a computing system, such as a central processing unit component and a graphics subsystem component, may consume power and generate heat as they operate. Moreover, a computing system will typically have limitations associated with how much power and/or heat should be generated during operation. For example, a computing system might have an overall power and/or thermal "budget" that can be allocated among the various components in the system. Note that exceeding such a budget might result in degraded performance and/or damage to the components in the system.

In some cases, a system-wide power or thermal management device will monitor and evaluate information about each component (e.g., statistics associated with how much power is being consumed by each component). Such a system-wide power management device may then allocate an overall power budget as appropriate. This approach, however, may have certain disadvantages. For example, a graphics subsystem might at certain times be unable to utilize additional power resources (e.g., when the graphics subsystem cannot process graphical information because it is waiting for another component—such as a central processing unit—to provide information) Similarly, the graphics subsystem might use the additional power but not provide a result that is valuable. In either case, it may be impractical to have a system-wide power management device determine the most efficient way to allocate an overall thermal budget.

DETAILED DESCRIPTION

Figure 1:
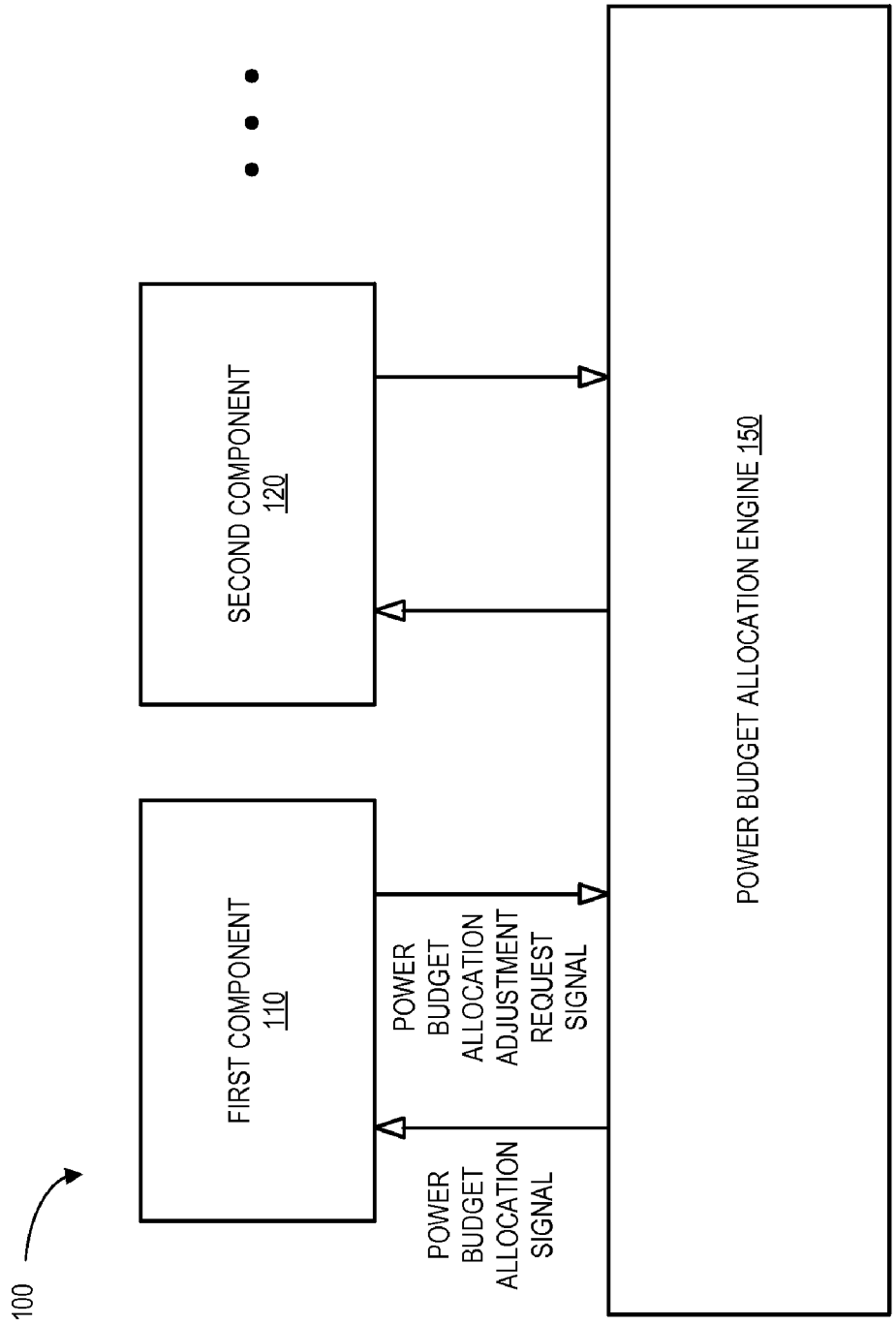
FIG. 1 is a block diagram of a multi-component computing system according to some embodiments.

Components in a computing system, such as a central processing unit component and a graphics subsystem component, may consume power and generate heat as they operate. For example, FIG. 1 is a block diagram of a system 100 that includes a first component 110 and a second component 120 according to some embodiments. Although two components 110, 120 are illustrated in FIG. 1, note that embodiments described herein might be associated with more components. The first component 110 might be, for example, associated with a graphics subsystem wile the second component 120 is associated with a Central Processing Unit ("CPU"). Note, however, that as used herein the term "component" might refer to any other type of device in a computing environment, including memory systems, network communication systems, and/or Input Output ("IO") IO systems.

The computing system 100 will typically have limitations associated with how much power and/or heat should be generated during operation. For example, the computing system 100 might have an overall power and/or thermal "budget" that can be allocated among the first and second components 110, 120. Note that as the amount of power consumed by a component increases the amount of heat generated by that component will typically also increase. As a result, embodiments described herein as being associated with a "power budget" or "power management system" also encompass the notion of a "thermal/heat budget" or "thermal/heat management system."

The system 100 further includes a power budget allocation engine 150 according to some embodiments. The power budget allocation engine 150 may, for example, facilitate an allocation of an overall power budget among the first and second components 110, 120 as appropriate.

By way of example, the first component 110 may determine that an adjustment of a power budget allocation for the first component 110 would be appropriate from the perspective of the first component. For example, the first component 110 might determine that it is currently consuming less than a local power limitation and yet could efficiently utilize additional power. In this case, the first component 110 might transmit a power budget allocation adjustment request signal to the power budget allocation engine 150. In other situations, the first component 110 determine that it would be unable to efficiently utilize additional power even it was available (e.g., because it isn't receiving information quickly enough from another component), and thus decide to not transmit a request for an increased allocation of the power budget. Similarly, the second component 120 might (or might not) determine that it would be able to utilize additional power and transmit a power budget allocation adjustment request signal to the power budget allocation engine 150.

The power budget allocation engine 150 might, according to some embodiments, receive the power budget allocation adjustment request signal from the first component 110. Moreover, based on the received budget allocation adjustment request signal, the power budget allocation engine 150 might determine whether to adjust a power budget allocation signal provided to the first component 110 (e.g., by deciding to increase a power limit imposed on the first component 110). According to some embodiments, the power budget allocation engine 150 determines whether to adjust the power budget allocation signal provided to the first component 110 based further a pre-determined preference (e.g., indicating that graphics or computational performance should be given higher priority in the system 100) and/or on the received budget allocation adjustment request signal received from the second component 120.

Note that the power budget allocation engine 150 might, according to some embodiments, determine whether to adjust a power budget allocation signal provided to the first component 110 further based on a total system budget, a current aggregate thermal state (e.g., associated with an overall amount of heat being generated by the system 100), and/or a current aggregate power state (e.g., associated with an overall amount of current being used by the system 100). Moreover, the power budget allocation engine 150 might perform the determination on a periodic basis (e.g., once each second) and/or upon a change in a power budget allocation adjustment request signal from the first or second component 110, 120.

Figure 2:
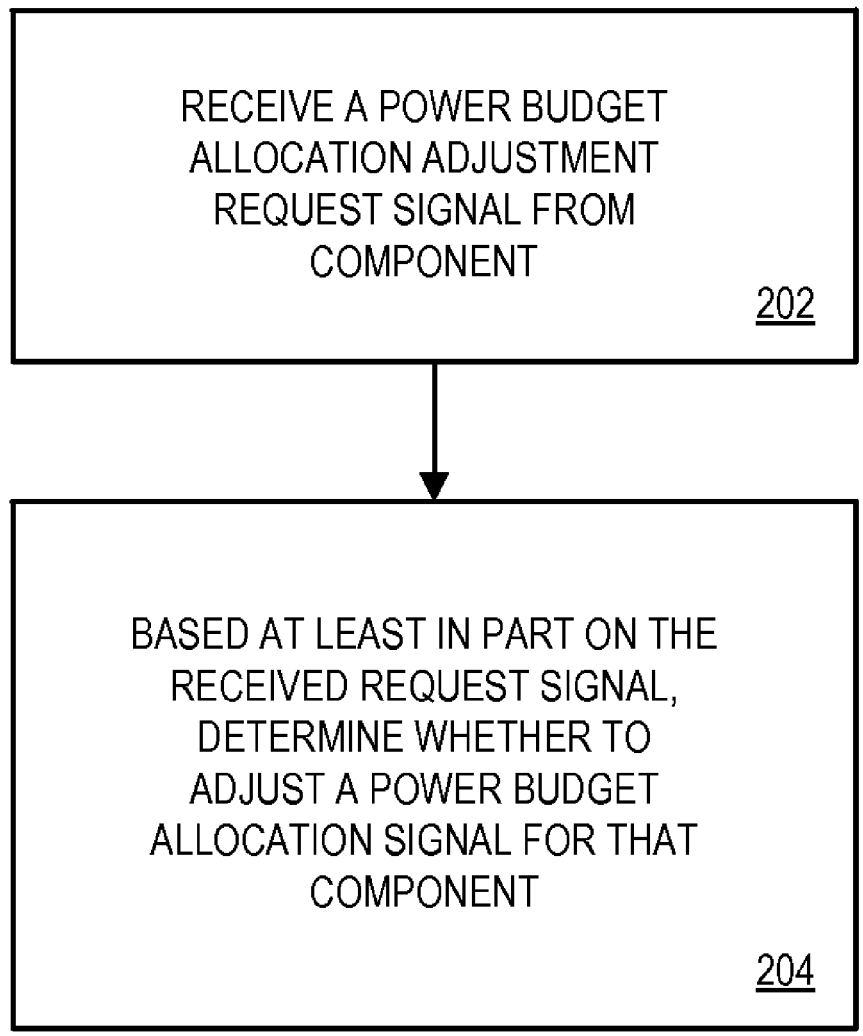
FIG. 2 is a flow chart of a method associated with a power budget allocation engine in accordance with some embodiments.

FIG. 2 is a flow chart of a method associated with a power budget allocation engine in accordance with some embodiments. The flow charts described herein do not necessarily imply a fixed order to the actions, and embodiments may be performed in any order that is practicable. The method of FIG. 2 may be associated with, for example, the system 100 described with respect to FIG. 1. Note that any of the methods described herein may be performed by hardware, software (including lower level code, such as microcode), or a combination of hardware and software. For example, a storage medium may store thereon instructions that when executed by a machine result in performance according to any of the embodiments described herein.

At 202, a power budget allocation engine of a multi-component computer system may receive a power budget allocation adjustment request signal from a first component. For example, the power budget allocation adjustment request signal might be an "increase request flag" that can be raised (or lowered) by the first component. Note that the first component might be associated with, by way of examples only, a processor such as a CPU or a graphics subsystem such as a Graphics and Memory Controller Hub ("GMCH").

Based on the received budget allocation adjustment request, the power budget allocation engine may determine at 204 whether to adjust a power budget allocation signal provided to the first component. The power budget allocation signal provided from the power budget allocation engine to the first component might be, for example, a limit signal or a "power clap" (e.g., an individual power limit imposed on a component that may be relaxed or raised as appropriate). Note that the determination at 204 might be dynamic (e.g., it might be performed automatically as conditions within the computing system change).

According to some embodiments, the determination at 204 is further based at least in part on a pre-defined "preference" associated with the computing system. For example, a computing system might be configured such that a graphics subsystem will typically receive preferential power allocations as compared to a CPU. In other cases, a computing system might be configured such that the CPU will receive preferential power allocations as compared to the graphics subsystem. The preference might be determined, for example, when a system is being designed or based on a selection by a user of the system (e.g., via a graphical interface).

Figure 3:
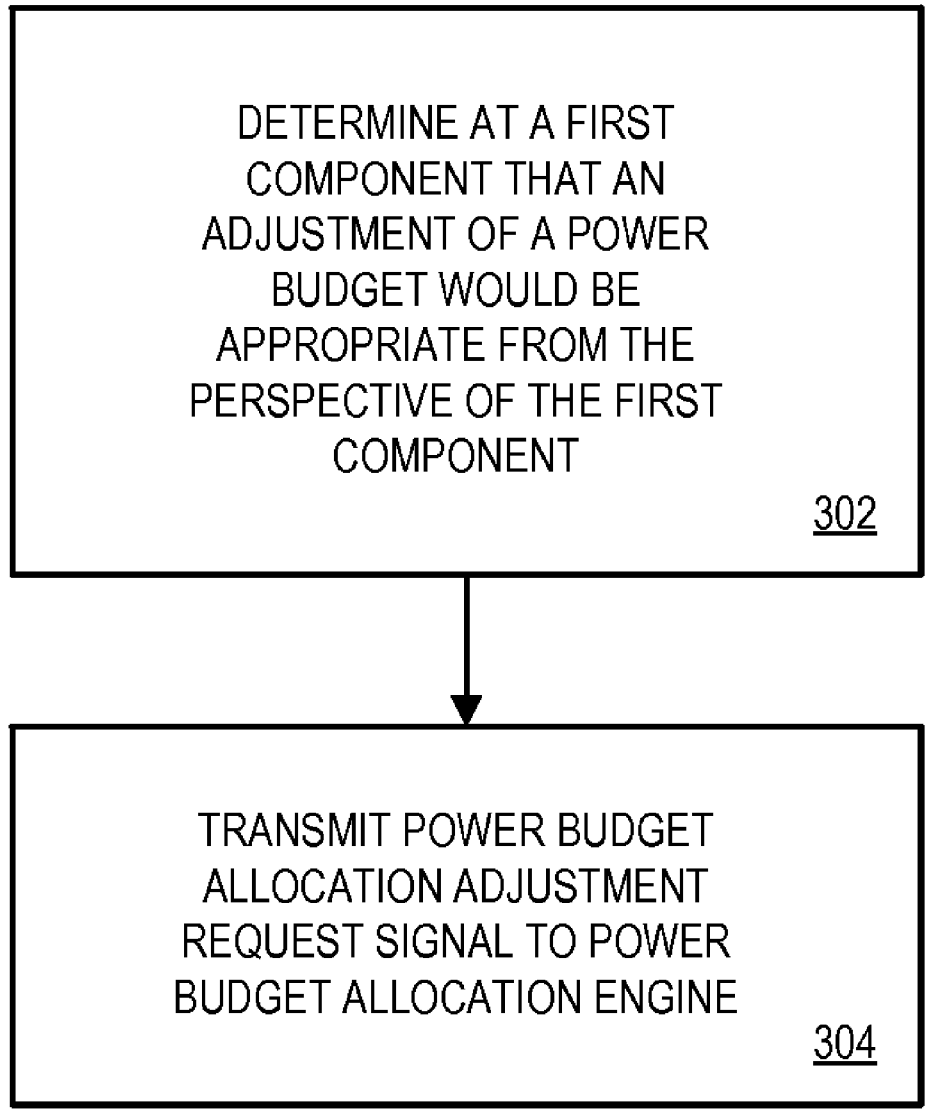
FIG. 3 is a flow chart of a method associated with a component according to some embodiments.

Thus, the power budget allocation engine may work together with various system components to facilitate an efficient allocation of power. For example, FIG. 3 is a flow chart of a method that might be performed by one of those components according to some embodiments. The method of FIG. 3 may be associated with, for example, the system 100 described with respect to FIG. 1.

At 302, A first component of a multi-component computer system may determine that an adjustment of a power budget allocation for the first component would be appropriate from the "perspective" of the first component. Note that the first component may be aware of whether or not an additional allocation of power could be usefully consumed. For example, when the first component is associated with a graphics subsystem it might determine that it is receiving updates from another component at a relatively slow rate and, as a result, would be unable to process and update information an faster than it already is.

Based on the determination, the first component may transmit a power budget allocation adjustment request signal to a power budget allocation engine at 304. Consider, for example, the case where the first component is associated with a graphics subsystem. In this case, the graphics subsystem might evaluate a current frame rate, render p-state, render frequency, and/or application being executed by the graphics subsystem (e.g., a graphics-intensive 3D game) before requesting an increase in its power allocation. As another example, if the first component is associated with a CPU it might evaluate an instruction execution rate and/or an application being executed by the CPU before requesting an increase in its power allocation.

The power budget allocation adjustment request signal transmitted to the power budget allocation engine might be associated with, for example, an increase request flag that can be raised (or lowered) by the first component. According to some embodiments, the first component may further determine whether or not to raise such a flag based on a thermal condition detected by the first component and/or a power consumption condition detected by the first component. For example, the first component might decide to not raise a flag asking for more power because it is currently generate too much heat (even though it would be able to process graphics information from another component faster with an increased power budget).

Thus, some embodiments may provide a control technique to allocate a shared power and/or thermal budget between multiple components such that an advantageous result is achieved. For example, if processing and graphics components share a power and/or thermal budget, an desired result might be to increase the frame rate achieved by the graphics subsystem (assuming, for example, a preference towards graphics performance). Given a preference towards processing performance, on the other hand, increasing the number of instructions retired per second (while not stalling for cache fills) might represent a more appropriate result.

Note that graphics applications typically require tasks that need to be performed by both a processor and a graphics subsystem. For example, the relationship may be configured as "consumer-producer" in that a graphics subsystem may rely on a completion of work by a processor to further the overall task. As such, in a scenario where a shared power and/or thermal budget exists among both components (and a preference towards graphics is established by a designer or user), allocating an increased amount power and/or thermal budget to the graphics subsystem may not lead to an improved result (e.g., a higher frame rate), because the performance of a CPU component is limited by its lack of budget (which, in turn may stall the graphics subsystem).

Figure 4:
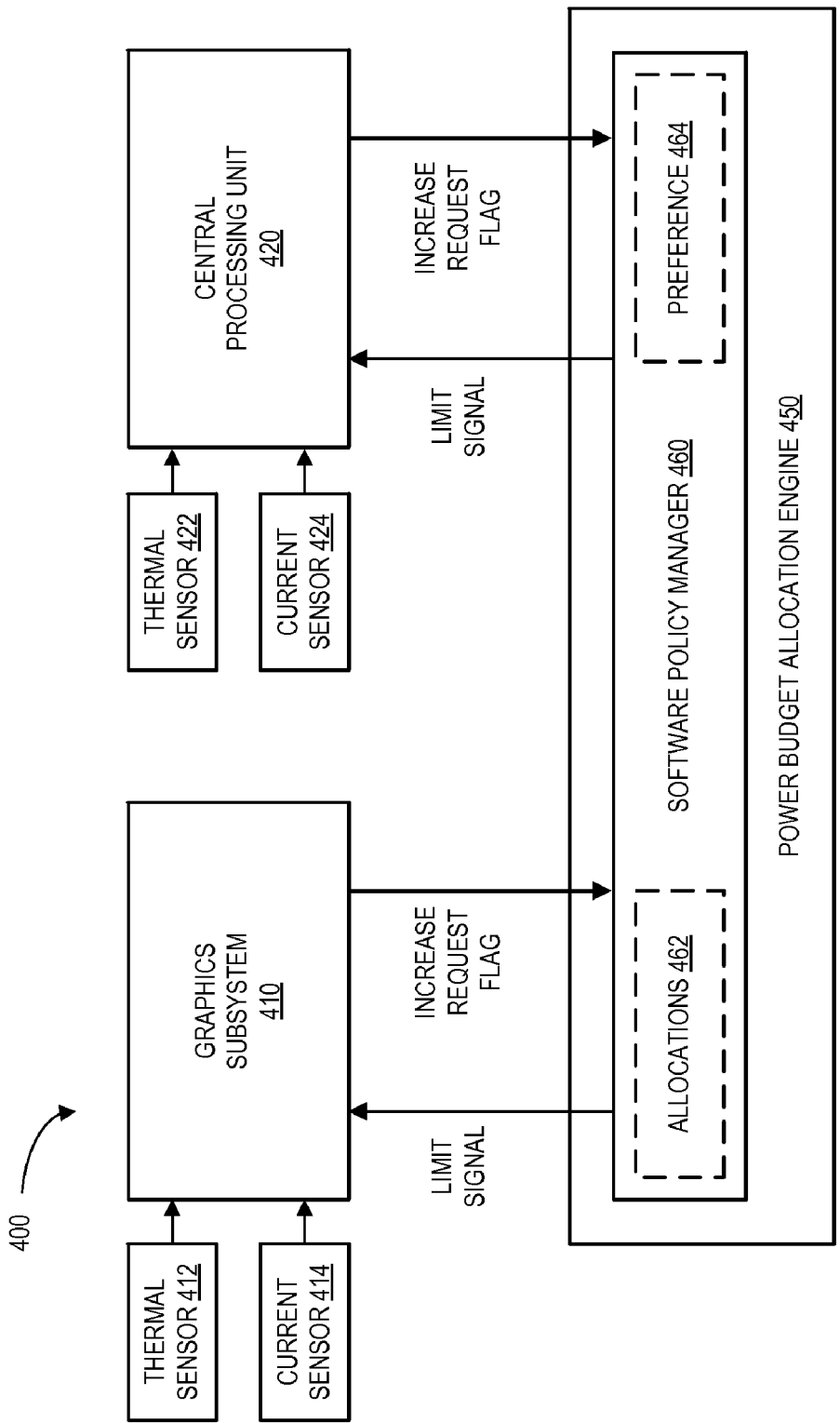
FIG. 4 is an example of a multi-component computing system according to some embodiments.

Consider, for example, FIG. 4 which provides an example of a multi-component computing system 400 according to some embodiments. The system 400 includes a graphics subsystem 410 and a CPU 420 (note, however, that system 400 could further include other components such as memory systems, network communication systems, and/or IO systems).

The computing system may 400 have a limitation associated with how much power and/or heat should be generated during operation. For example, the computing system 400 might have an overall power and/or thermal budget that can be allocated among the graphics subsystem 410 and CPU 420. To facilitate this task, the system 400 may further include a power budget allocation engine 450 with a software policy manager 460 according to some embodiments.

According to some embodiments, the software policy manager 460 manages a power and/or thermal budget associated with multiple components (and component software interfaces) to facilitate improved results given a system preference. Note that a component's software interface might include a power limit input (e.g., a "clamp value" indicating an upper level of power that can be used by that particular component) and an output flag that indicates whether or not that component desires additional budget. This partitioning may locate certain decisions associated with managing a power budget inside that component (and may help insulate the software policy manager 460 from component-specific information).

In the case of the graphics subsystem 410 that has implemented a demand-based selection of render frequency (e.g., render p-state), a decision to raise the "increase request" output flag (indicating more budget is desired by the graphics subsystem 410) might be tied to an internal selection of a highest available render p-state (which could, for example, be selected by detecting utilization). The highest available render p-state may be, for example, determined via a mapping of the power limit signal imposed on the graphics subsystem 410 by the software policy manager 460. Note that improvement of a particular figure of merit (e.g., frames per second), can be managed substantially entirely by the graphics subsystem 410. For example, as utilization and workload (e.g., a gaming application) warrant, the render p-state might be increase to a highest level allowed by the power limit, and the graphics subsystem 410 may then raise the output flag to indicate that additional budget could be used. Similarly, if a video application is detected the output flag from the graphics subsystem 410 might indicate that no additional budget would be useful because a maximum frame rate (corresponding to the video) has already been achieved.

According to some embodiments, the software policy manager 460 executes a policy manager control loop that, given a preference 464 towards graphics performance, may successively increase the budget of the graphics subsystem 410 (e.g., the power limit signal provided to the graphics subsystem 410), wait (e.g., for a relatively small pre-determined period of time), and then check the output increase request flag to see if the graphics subsystem 410 can use more budget. If so, additional budget may provided by the software policy manager 460 and the cycle may repeat. If the graphics subsystem 410 indicates that additional budget cannot be used (e.g., the increase request flag is not raised), then the software policy manager might instead provide additional budget to the CPU 420. The software policy manager 460 may then wait and again read the output flag from the graphics subsystem 410 to detect if additional budget can now be used (potentially due, for example, to the increase in CPU 420 budget provided in the previous cycle). Note that the CPU 420 might indicate an ability to use budget in a similar manner (e.g., and the preference of the system 400 may be is toward processing performance instead of graphics performance).

Note that a component might decide to not raise the increase request flag even when additional power could be locally used. For example, the graphics subsystem 410 might detect conditions from a local thermal sensor 412 and/or current sensor 414 that prevents it from raising the increase request flag. Similarly, the CPU 420 might detect conditions from a local thermal sensor 422 and/or current sensor 424 that prevents it from raising the increase request flag.

Also note that the software policy manager 460 may, according to some embodiments, determine whether to adjust a limit signal provided to the graphics subsystem 410 and/or the CPU 420 based various allocation parameters 462. For example, such allocation parameters 462 might be associated with a total system budget, a current aggregate thermal state (e.g., associated with an overall amount of heat being generated by the system 400), and/or a current aggregate power state (e.g., associated with an overall amount of current being used by the system 400).

According to some embodiments, the software policy manager 460 makes budget adjustments automatically and/or dynamically. For example, the software policy manager 460 might make budget adjustments as conditions associated with the system 400 change (e.g., when a component raises or lowers an increase request flag). According to some embodiments, the software policy manager 460 periodically evaluates the system 400 to determine whether any power budget adjustments are appropriate.

Figure 5:
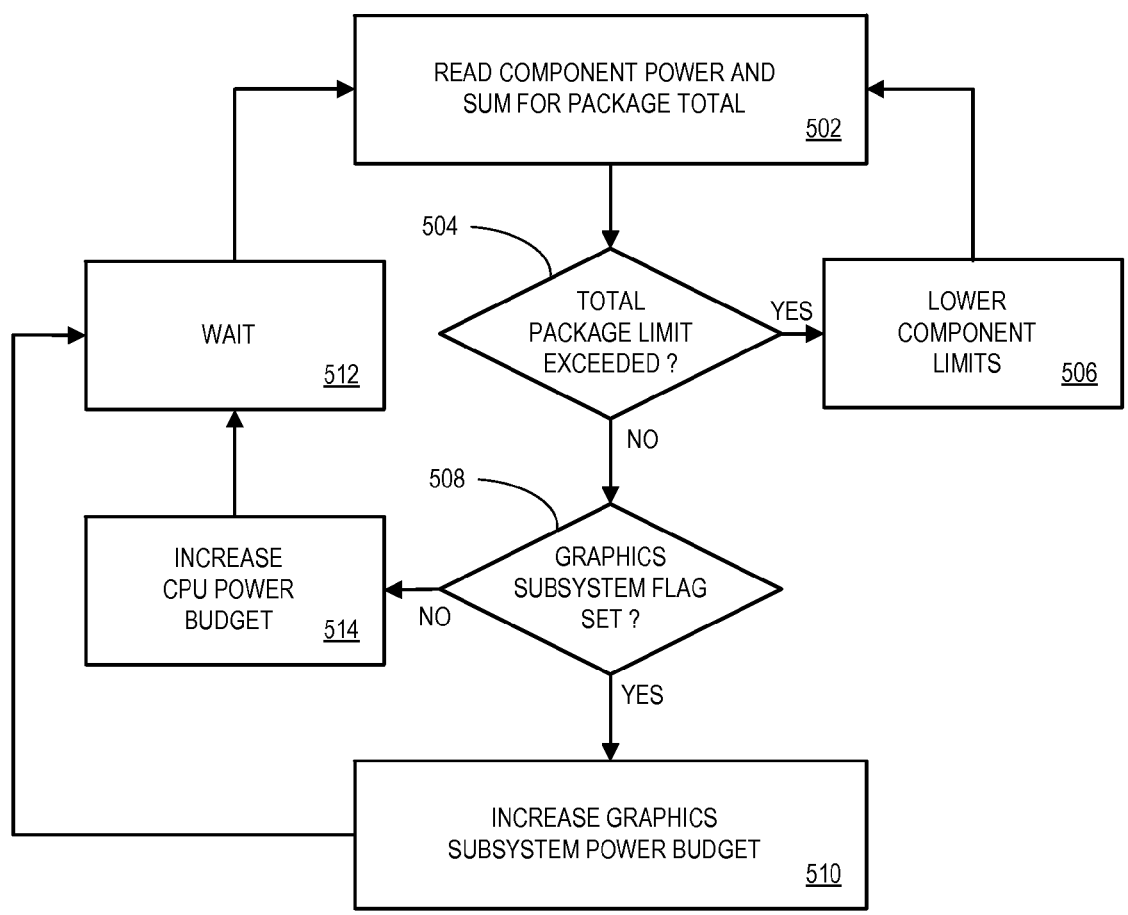
FIG. 5 is a flow chart of a method in accordance with some embodiments.

For example, FIG. 5 is a flow chart of a method in accordance with some embodiments. In this example, it is assumed that a system includes a graphics subsystem and a CPU and that a preference for graphics performance has been established (over CPU processing performance). At 502, amounts of power currently being consumed by various components may be read and summed to determine an overall system or package total power level. If the total power level already exceeds a total package limit at 504, one or more component-specific limits may be lowered at 506. Note that the lowering of component-specific limits at 506 could be performed any number of ways (e.g., limits for all components might be lower equally or on a proportional basis and/or may take into account system preferences).

If the total power level already does not currently exceed a total package limit at 504, it is determined whether or not a graphics subsystem flag is currently set at 508 (e.g. indicating that, from the perspective of the graphics subsystem, more power could be efficiently allocated to graphics subsystem).

If the graphics subsystem flag is set at 508, the graphics subsystem budget is increased at 510 (e.g., by increasing a limit value signal to the graphics subsystem by a pre-determined amount). If the graphics subsystem flag not set at 508, a CPU budget is increased at 514 (e.g., by increasing a limit value signal to the CPU by a pre-determined amount). Note that the increase allocation is first given to the graphics subsystem instead of the CPU (assuming that the graphics subsystem is able to utilize the increase) because the preference of the system was established to be towards graphics performance. After the graphics or CPU power budgets are increased, the system may wait at 512 for a pre-determined period of time before repeating the cycle.

Thus, embodiments described herein may provide systems and methods to efficiently allocate a power budget amount multiple components. Moreover, a power budget allocation engine may facilitate the process without needing to evaluate component-specific parameters.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to particular components, any other types of components may be evaluated and/or allocated power. Moreover, other types of allocation algorithms may be provided instead of, or in addition to, those described herein.

Moreover, some embodiments are described as using an "increase request flag" from a component. Note, however, that any embodiment might instead use "decrease request flags" from components (e.g., indicating that the component is currently being allocated more power than it can efficient use). Similarly, although some embodiments are described as implementing a "component preference," in other cases an indication of a "least-preferred component" could be employed (e.g., one component might be designated as being least important in a system having three components). Moreover, according to still other embodiments, power budget allocation request signals might be transmitted component-to-component and/or a single device may act as both a first component and a power budget allocation engine.

The several embodiments described herein are solely for the purpose of illustration. Persons skilled in the art will recognize from this description other embodiments may be practiced with modifications and alterations limited only by the claims.

What is claimed is:

1. A method, comprising:
receiving, at a power budget allocation engine of a multi-component computer system including a graphics subsystem and a processor comprising a shared power budget, both coupled to the power budget allocation engine, a power budget allocation adjustment request signal from the graphics subsystem, the request signal indicating that the graphics subsystem requires additional power, wherein the indication associated with the request signal is based on a determination that the graphics subsystem is unable to process information due to updates from the processor being received at a slow rate; and
based on the received budget allocation adjustment request, increasing a frame rate of the graphics subsystem, wherein said increasing is based at least in part on the shared power budget and a current aggregate thermal state.

2. The method of claim 1, wherein said determining is based at least in part on a pre-defined component preference indicating that graphics should be given higher priority in the system as compared to computational performance.

3. The method of claim 1, wherein the power budget allocation signal provided from the power budget allocation engine to the graphics subsystem comprises a limit signal.

4. The method of claim 1, wherein the power budget allocation adjustment request signal provided from the graphics subsystem to the power budget allocation engine comprises an increase request flag.

5. The method of claim 1, wherein the graphics subsystem is a graphics and memory controller hub.

6. The method of claim 1, wherein said determining is based at least in part on a budget allocation adjustment request signal received from the processor.

7. The method of claim 1, wherein said determining is performed by a software policy manager of the power budget allocation engine.

8. The method of claim 1, wherein said determining is performed at least one of: (i) on a periodic basis, or (ii) upon a change in a power budget allocation adjustment request signal from a component.

9. A method, comprising:
determining, at a graphics subsystem of a multi-component computer system including the graphics subsystem and a processor that share a power budget, both coupled to a power budget allocation engine, that the graphics subsystem is unable to process information due to updates from the processor being received at a slow rate and that the graphics subsystem requires additional power based on an amount of information being received at the graphics subsystem, wherein said determining is further based at least in part on the shared power budget and a current aggregate thermal state; and
based on said determination, transmitting a power budget allocation adjustment request signal to the power budget allocation engine of the multi-component system associated with increasing a frame rate of the graphics subsystem.

10. The method of claim 9, wherein said determining is associated with a frame rate and a render p-state.

11. The method of claim 9, wherein said transmitting comprises raising an increase request flag to the power budget allocation engine.

12. The method of claim 9, wherein said determining is further based on a thermal condition detected by the graphics subsystem.

13. An apparatus, comprising:
a processor;
a graphics subsystem comprising a shared power budget with the processor, the graphics subsystem to: (i) determine that an adjustment of a power budget allocation for the graphics subsystem to increase a frame rate of the graphics subsystem would be appropriate from the perspective of the graphics subsystem based on a determination that the graphics subsystem is unable to process information due to updates from the processor being received at a slow rate and on
wherein said determining is further based at least in part on a shared power budget and a current aggregate thermal state, and (ii) based on the determination, transmit a power budget allocation adjustment request signal; and
an output, coupled to the graphics subsystem, to provide the power budget allocation adjustment request signal;
a power budget allocation engine, coupled to the graphics subsystem and processor, to: (i) receive the power budget allocation adjustment request signal from the graphics subsystem associated with increasing a frame rate of the graphics subsystem, and (ii) based on the received budget allocation adjustment request signal and component preference, adjusting a power budget allocation signal provided to the graphics subsystem.

14. The apparatus of claim 13, wherein the processor is to: (i) determine that an adjustment of a power budget allocation for the processor would be appropriate from the perspective of the processor, and (ii) based on the determination, transmit a power budget allocation adjustment request signal.

15. The apparatus of claim 14, wherein the power budget allocation engine determines whether to adjust the power budget allocation signal provided to the graphics subsystem based further on the received budget allocation adjustment request signal received from the processor.

16. The apparatus of claim 13, wherein the power budget allocation engine performs the determination at least one of: (i) on a periodic basis, or (ii) upon a change in a power budget allocation adjustment request signal from a component.

17. An apparatus, comprising:
a power budget allocation engine to: (i) receive a power budget allocation adjustment request signal from a graphics subsystem, the request signal indicating that the graphics subsystem has determined that the graphics subsystem is unable to process information due to updates from a processor being received at a slow rate, wherein the indication associated with the request signal is based on increasing a frame rate of the graphics subsystem, and (ii) based on the received budget allocation adjustment request signal and component preference, determine whether to adjust a power budget allocation signal provided to the graphics subsystem, wherein the power budget allocation engine determines whether to adjust a power budget allocation signal provided to the graphics subsystem further based on a shared power budget between the graphics subsystem and the processor and a current aggregate thermal state; and
an output line, coupled to the power budget allocation engine, to provide the power budget allocation signal.

18. The apparatus of claim 17, wherein the power budget allocation engine performs the determination at least one of: (i) on a periodic basis, or (ii) upon a change in a power budget allocation adjustment request signal from a component.

* * * * *